(No Model.)

R. BARRETT.
TRAVELER FOR CARRYING CARCASSES.

No. 331,758. Patented Dec. 8, 1885.

Witnesses
Wm. G. Lipsey
Geo. Wadman

Inventor
Richard Barrett,
by his attorneys,
Gifford & Brown

UNITED STATES PATENT OFFICE.

RICHARD BARRETT, OF NEWARK, NEW JERSEY.

TRAVELER FOR CARRYING CARCASSES.

SPECIFICATION forming part of Letters Patent No. 331,758, dated December 8, 1885.

Application filed April 23, 1885. Serial No. 163,211. (No model.)

*To all whom it may concern:*

Be it known that I, RICHARD BARRETT, of Newark, in the county of Essex and State of New Jersey, have invented a certain new and useful Improvement in Travelers for Carrying Carcasses of Animals, &c., along Tracks; and I do hereby declare that the following is a specification of the same.

My improvement relates particularly to the travelers which are combined with tracks and employed to convey carcasses of animals and like things from place to place. Such travelers usually consist of a frame connected to a flanged wheel adapted to run on a track and having a portion depending below the wheel and provided with a hook or analogous device, affording a convenient means for the attachment of the things to be carried by the traveler.

The improvement consists in the combination, in a traveler, with a flanged wheel adapted to run on a track, of a frame hung on the journals of the wheel and extending on one side of the wheel far enough only to receive the journal which projects beyond that side of the wheel, and extending on the other side of the wheel below the wheel a sufficient distance to leave a wide space between its lower end and the wheel, said frame being provided with a shoulder extending into a plane coincident with one side of the tread of the wheel, a hook or like device being arranged upon the frame for the attachment of the thing to be carried by the traveler. The shoulder on the frame facilitates the proper placing of the wheel of the traveler upon its track.

Figure 1:
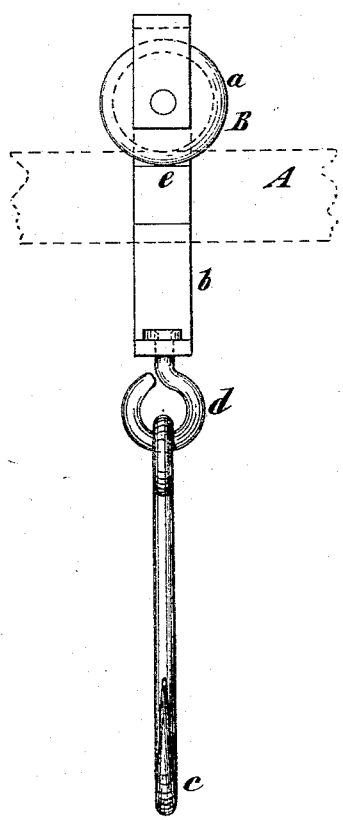
Figure 2:
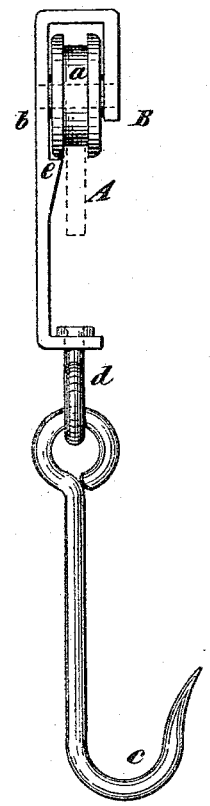

In the accompanying drawings, Figure 1 is a view of a traveler taken in a vertical plane parallel to one side of wheel. Fig. 2 is a view of the traveler taken in a vertical plane at right angles to that of Fig. 1. I have also shown a track for the traveler.

Similar letters of reference designate corresponding parts in both figures.

A designates a track, which may be made of iron, in any suitable form, and supported in any approved manner.

B designates the traveler. The traveler has a wheel, *a*, shown as having a tread and flanges at the sides and adjoining the tread. The tread of the wheel is adapted to bear on the top of the track A, and the flanges to extend down adjacent to the sides of the track. A frame, *b*, is hung on the journals of the wheel *a*. These journals may be part of a non-rotary shaft, on which the wheel turns, or they may turn with the wheel. The upper part of the frame embraces the wheel. On one side it extends down far enough only to reach the journal, which extends beyond the adjacent side of the wheel; but at the other side it extends down below the wheel a sufficient distance to leave a wide space between its lower end and the wheel. It has a hook, *c*, secured to it, the extreme end being bent inward under the wheel and perforated to receive a headed swivel-pin, *d*, to which the hook *c* is connected. The hook constitutes a convenient means for attaching things desired to be carried by the traveler. The traveler is placed on the track by elevating it, so that the wheel is above the track and the short side of the frame toward the track, and then moving it sidewise and downward, so that the tread of the wheel will be made to rest upon the track and the flanges to lap over the sides of the track. The long side of the frame *b* is provided, just below the wheel *a*, with a shoulder, *e*, which extends out to a plane coincident with one side of the tread of the wheel, and also coincident with the inner side of the flange of the wheel that is adjacent to the long side of the frame. Its face is inclined. When the traveler is being placed upon the track, should it be moved over too far, the track will come in contact with said shoulder, and the traveler will thereby be moved laterally and guided by the shoulder into a position where the track will pass between the flanges of the wheel. By this means the placing of the traveler upon the track is materially facilitated, and may be very quickly performed.

I do not herein claim, broadly, a traveler consisting of a wheel adapted to travel upon a rail, the same being mounted in a frame provided with a hook; nor do I claim a shoulder arranged upon the frame in such position as not to facilitate the placing of the traveler upon the rail, as the same are old.

What I claim as my invention, and desire to secure by Letters Patent, is—

In a traveler, the combination, with a flanged wheel provided with journals and adapted to run upon a track, of a frame extending on one side of the wheel far enough only to receive the journal on that side of the wheel, and extending on the other side a sufficient distance to leave a wide space between its lower end and the wheel, said frame being provided with an inclined projection forming a shoulder extending into a plane coincident with the tread of the wheel, to facilitate the placing of the wheel upon the track, and having a hook upon its lower end, substantially as described, and for the purpose specified.

RICHARD BARRETT.

Witnesses:
MILES S. RIGGS,
WM. H. GASTON.